United States Patent [19]

Godines

[11] Patent Number: 5,645,720
[45] Date of Patent: Jul. 8, 1997

[54] MOUNTING HEAD WITH BY-PASS VALVE FOR USE WITH CARTRIDGE FILTERS

[75] Inventor: David L. Godines, Orangevale, Calif.

[73] Assignee: R & D Separations, Inc., Rancho Cordova, Calif.

[21] Appl. No.: 398,625

[22] Filed: Mar. 2, 1995

[51] Int. Cl.⁶ .................................................. B01D 27/10
[52] U.S. Cl. ............................ 210/282; 55/312; 210/288; 210/420
[58] Field of Search ................. 55/312, 422; 137/599.1; 210/420, 424, 282, 288

[56] References Cited

U.S. PATENT DOCUMENTS

| | | | |
|---|---|---|---|
| 816,517 | 3/1906 | Whalen | 210/420 |
| 2,134,385 | 10/1938 | Winslow | 210/420 |
| 3,368,679 | 2/1968 | Bozek | 210/90 |
| 3,909,221 | 9/1975 | Bengtsson | 55/314 |
| 4,077,876 | 3/1978 | Southall | 210/136 |
| 4,303,514 | 12/1981 | Theorell | 210/136 |
| 4,529,514 | 7/1985 | Gruett | 210/234 |
| 4,529,515 | 7/1985 | Selz | 210/420 |
| 5,139,050 | 8/1992 | Otto | 210/424 |
| 5,334,309 | 8/1994 | Huggett et al. | 210/133 |
| 5,336,406 | 8/1994 | Stanford et al. | 210/235 |

OTHER PUBLICATIONS

Product Catalog of R & D Separations entitled "High Performance Filtration and Chromatography Products".

*Primary Examiner*—Ivars Cintins
*Attorney, Agent, or Firm*—Lothrop & West

[57] ABSTRACT

A mounting head with an internal by-pass valve for use with disposable cartridge filters, for purifying gases or liquids. In preparation for changing a spent filter, the valve mechanism is translated from a first, lowered position to a second, raised position. Product is thereby redirected through a bypass passageway, allowing an uninterrupted flow of gas or liquid product to the downstream appliance or instrument. Concurrent with the valve translation, the old filter is physically decoupled from the head, and a new filter is installed in its place. Retranslation of the valve to its first position, resumes product flow through the cartridge filter.

15 Claims, 5 Drawing Sheets

5,645,720

MOUNTING HEAD WITH BY-PASS VALVE FOR USE WITH CARTRIDGE FILTERS

FIELD OF THE INVENTION

The invention relates generally to the field of filter systems, designed to remove pollutants from a fluid, such as a gas or a liquid flow. More specifically, the invention pertains to a mounting head for quick change cartridge type filters, effective for removing oxygen, moisture, hydrocarbons, or other impurities from gases. The present construction may also be used advantageously with a cartridge filter for liquids, having appropriate media and filter elements for removing chemicals, minerals, particles, or the like.

BACKGROUND OF THE INVENTION

Gases used in connection with certain laboratory testing procedures must be essentially free from impurities and pollutants which would otherwise undermine the usefulness or accuracy of the test. For these applications, previously manufactured gases may have to be filtered and cleansed by the on-site user, before introduction into a test instrument.

For example, in the field of gas chromatography, manufactured carrier gas must be subjected to further filtration at the laboratory site, before it can be utilized in a test instrument. For that purpose, filters have been developed, for in-series installation between the gas storage tanks and the chromatograph.

Most laboratories locate their compressed gas tanks or cylinders in a centralized storage area. Gas is distributed from the cylinders to a plurality of instruments in various locations, by means of copper or stainless steel tubing. Traditionally, gas purifiers or filters were installed at the storage area, adjacent the gas cylinders. However, this approach requires that the operator leave his instrument unattended, each time the filters are periodically changed or checked for condition.

In response to this need, point of operation cartridge panels were developed. These panels are designed for convenient installation, adjacent the chromatography instrument. Point of operation cartridge panels have also been used in connection with other gas utilization devices, which require gas having special purity requirements. These panels enable the operator of the instrument or appliance to monitor gauges and check the condition of indicating filters, changing the filters as necessary.

Each panel typically has a plurality of cartridge type filters, interconnected in series fashion between the incoming line and the instrument. Each filter is especially designed to remove a particular contaminant, such as oxygen, moisture, or hydrocarbons.

The cartridges are secured within cartridge mounting heads, having a coupling mechanism for detachably locking the cartridge in place. Each mounting head also includes internal passageways, which route incoming gas through the filter and then pass the cleansed gas on to another filter or to the gas utilization apparatus.

To replace a cartridge in a prior art panel, a cartridge retaining nut is first unscrewed from the head. Then, the spent cartridge is removed, exposing the downstream side of an inlet check valve and the upstream side of an outlet check valve to atmospheric pressure. This relative drop in pressure actuates each valve, respectively, into a closed position, isolating the cartridge mounting head from upstream and downstream components. Gas flow through the head and the entire panel is therefore interrupted while the cartridge is being replaced. This necessarily causes down time in the operation of the instrument, and may corrupt gas in the line if the check valves develop leaks.

SUMMARY OF THE INVENTION

The present invention improves upon the prior art point of operation cartridge panels by providing a simple and effective means for temporarily by-passing the fluid flow from the inlet port directly to the outlet port of the cartridge head, during the process of replacing a spent cartridge with a new cartridge. In this manner, downtime of the test instrument or the downstream appliance is avoided during the cartridge changeover period.

The mounting head and by-pass valve of the present invention comprise a cylinder and an associated piston. A cartridge type filter, having inflow and outflow apertures on a coupling end, is detachably coupled to the lower end of the cylinder. A top plate is mounted over the upper end of the cylinder. Inlet and outlet ports, allowing the ingress and egress of fluid, such as gas or liquid, are provided in the intermediate sidewall of the cylinder.

The piston has inlet and outlet passageways, leading from respective sidewall portions of the piston to the bottom portion thereof. In a first position, the passageways align with respective inlet and outlet ports, and direct fluid for filtration through the cartridge by means of the inflow and outflow apertures therein.

The piston is manually translatable from this first position to a second position, in which fluid is by-passed directly from the inlet port to the outlet port. Concurrently, the old cartridge is released for removal by the technician, who thereafter inserts a new cartridge into the mounting head. To complete the operation, the technician translates the piston into the first position, and purification of incoming fluid resumes.

DETAILED DESCRIPTION OF THE PREFERRED EMBODIMENT

Figure 1:
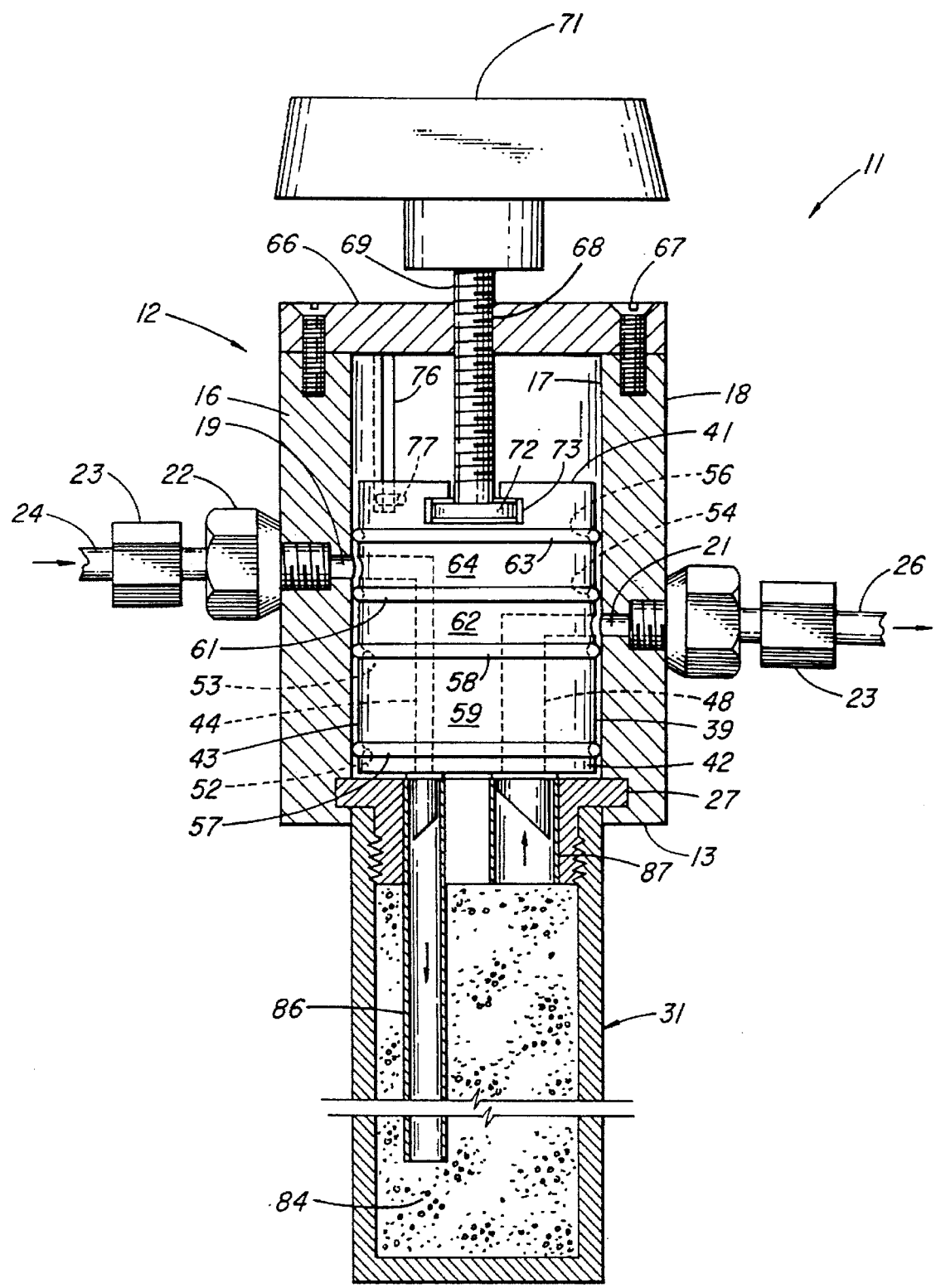
FIG. 1 is a median, longitudinal, cross-sectional view of the device of the present invention, coupled to a gas filter cartridge.

The apparatus 11 of the present invention includes a an elongated, right-circular cylinder, or sleeve 12, having a lower end 13, an upper end 14, and a wall 16 therebetween. Wall 16 has an inner sidewall 17 and an outer sidewall 18. A threaded inlet port 19 extends through one side of wall 16. A threaded outlet port 21 extends through the opposite side of wall 16. It should be noted that port 21 is offset in vertical relation, a predetermined distance with respect to inlet port 19. Threaded nuts 22 and couplers 23 are provided to interconnect inlet line 24 and outlet line 26 to their respective ports.

A U-shaped recess 27 transversely intersects lower end 13 of cylinder 12. Recess 27 is sized and configured to accommodate a D-shaped flange 28 on one end 29 of filter cartridge 31. It should be noted that one side of recess 27 has a shallow groove 32, whereas the other side has a relatively deep groove 33.

Flange 28 has a flat 34 which is adjacent inflow aperture 36, and remote from outflow aperture 37. The depth of shallow groove 32 is such that it can only accommodate the portion of flange 28 between flat 34 and an adjacent wall of cartridge tube 38. As a consequence, the cartridge can only be installed into the apparatus 11, having a correct orientation within recess 27. With the cartridge so installed, inflow aperture 36 and outflow aperture 37 are in predetermined locations, prepared for coupling with corresponding portions of piston 39.

Piston 39 is right-circular cylindrical in configuration, and concentrically positioned within cylinder 12. Piston 39 has a diameter slightly smaller than the inner diameter of cylinder 12, so that the piston can be translated upwardly and downwardly therein. Piston 39 includes a top portion 41, a bottom portion 42, and an outer peripheral sidewall 43, therebetween.

An inlet passageway 44 extends from a first side of sidewall 43 through the body of the piston, to the bottom portion 42. Inlet pipe 46 interconnects with passageway 44, and is fitted with a small O-ring 47. An outlet passageway 48 extends from a second side of sidewall 43 through the body of the piston, also to the bottom portion 42. Outlet pipe 49 interconnects with passageway 48, and is fitted with a larger O-ring 51.

The inlet passageway in the first side and the outlet passageway in the second side are offset in vertical relation, a distance which is identical to the predetermined vertical offset between inlet port 19 and outlet port 21. In the preferred embodiment, inlet port 19 and outlet port 21 lie in the same diametral plane, as are respective portions of passageways 44 and 48 which mate with those ports. However, other orientations of the ports and respective passageways may be used, for a more convenient interconnection between the apparatus and incoming and outgoing lines.

Figure 2:
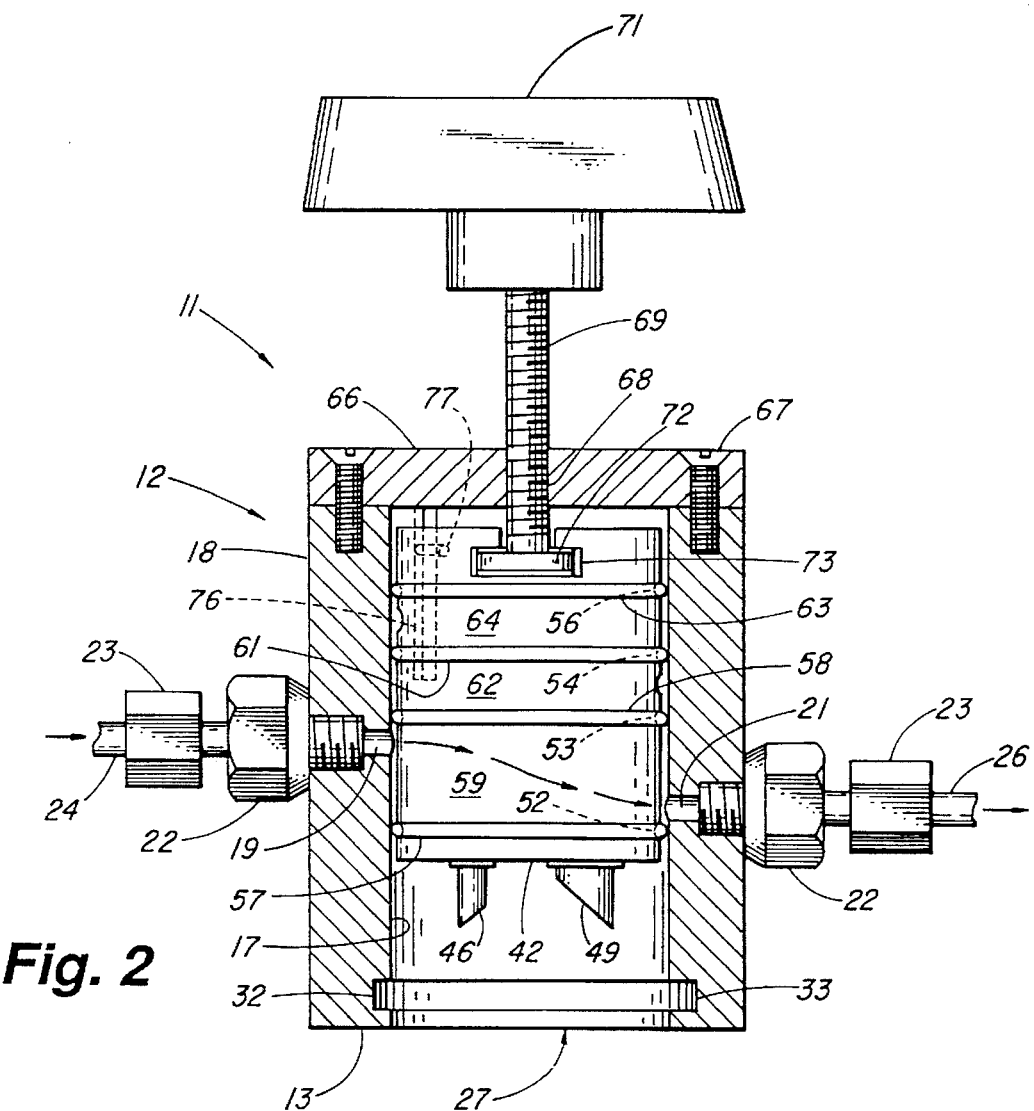
FIG. 2 is a median, longitudinal, cross-sectional view as in FIG. 1, but with the piston in a second position and the gas filter cartridge removed.
Figure 3:
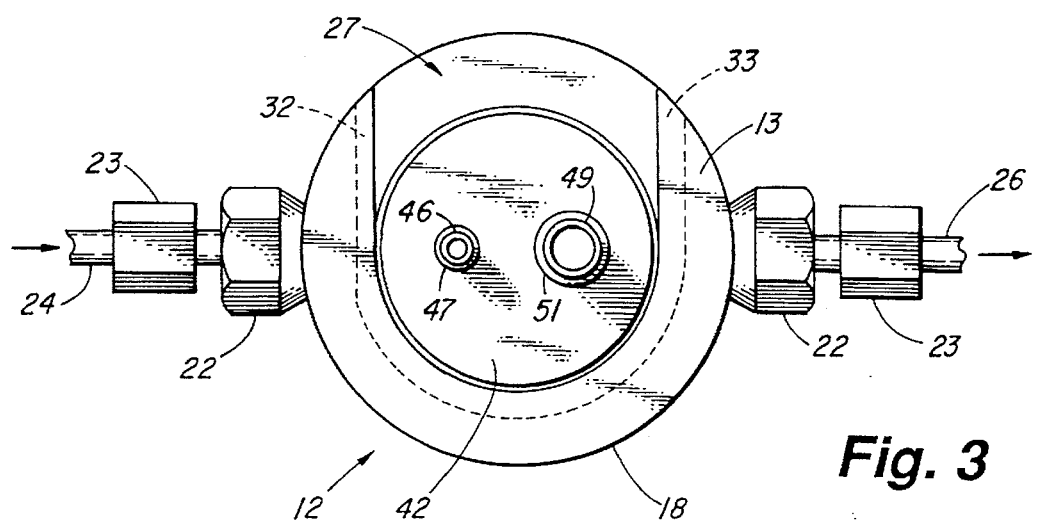
FIG. 3 is a bottom plan view of the device shown in FIG. 2.
Figure 4:
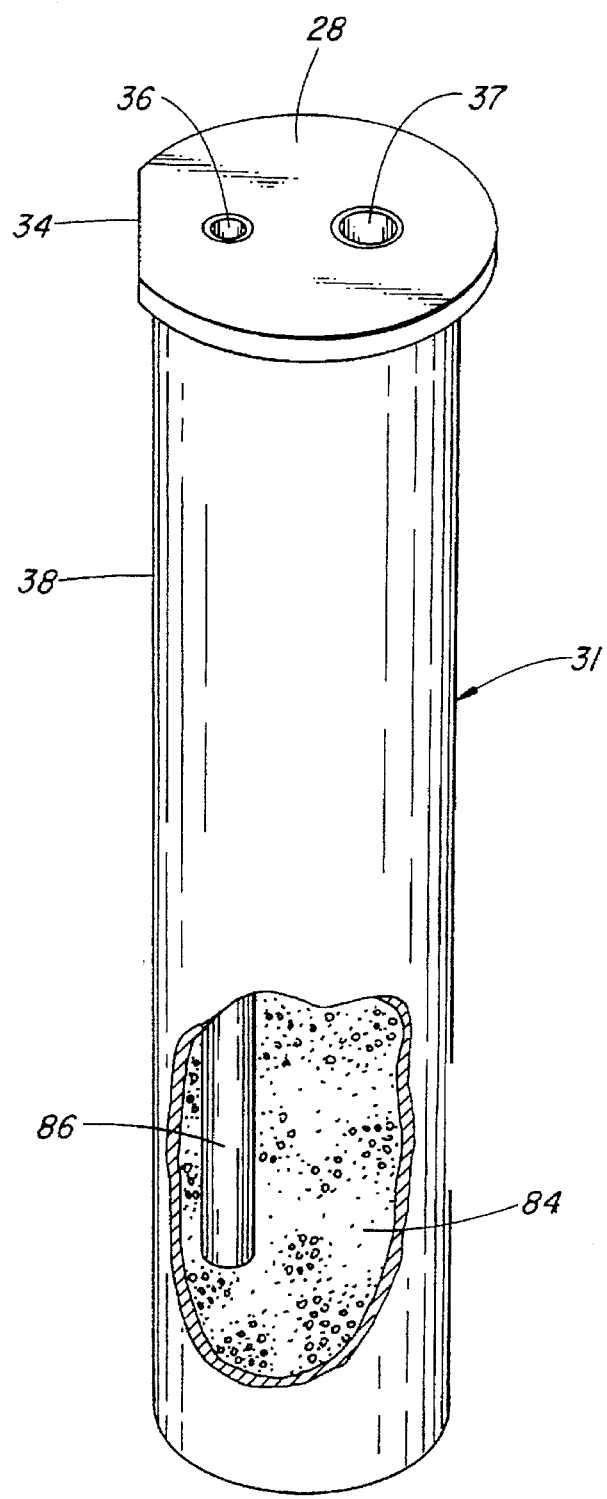
FIG. 4 is an isometric view of a gas filter cartridge, with the lower portion of the cartridge sidewall being broken away to show internal components.
Figure 5:
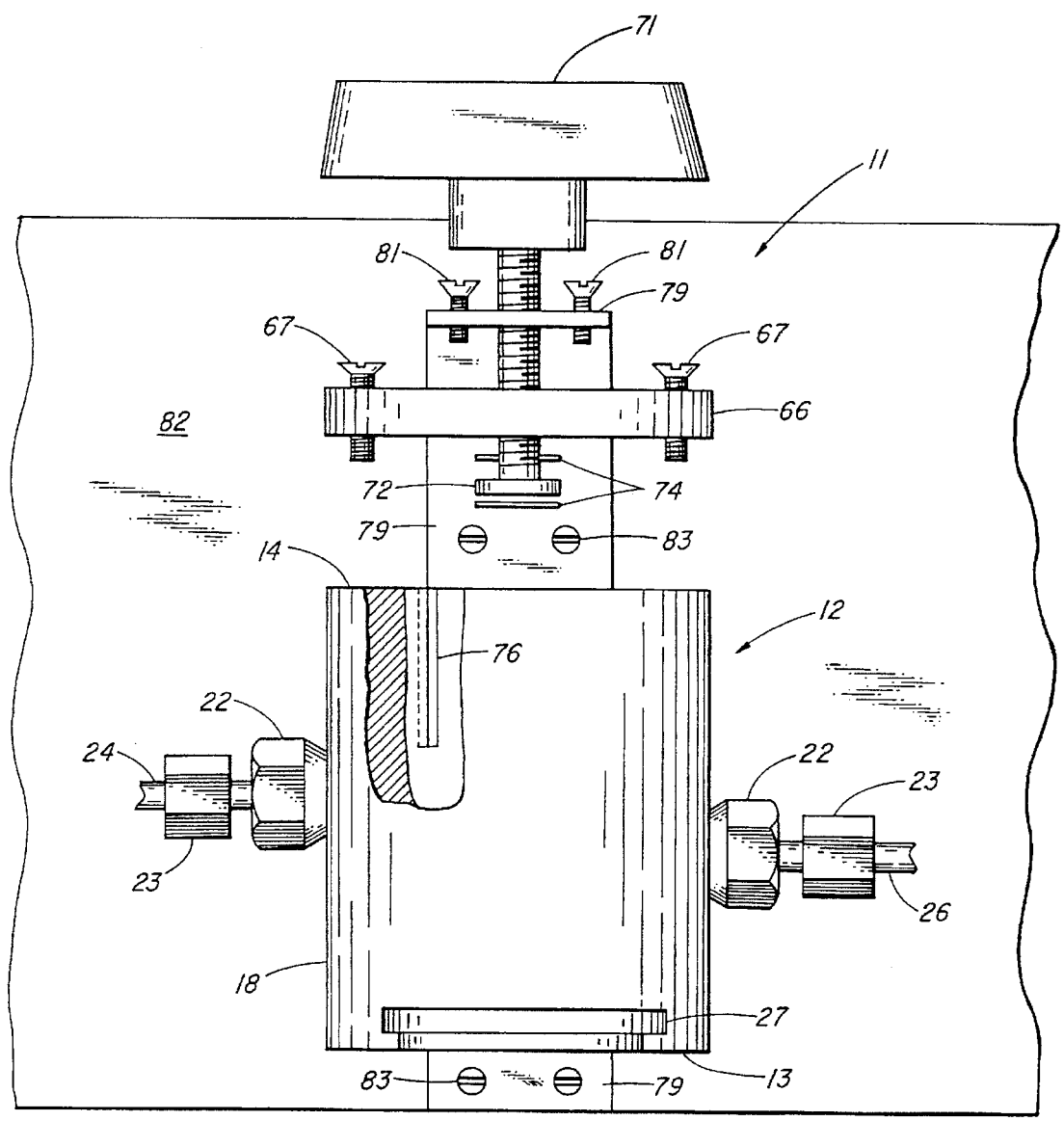
FIG. 5 is a front elevation showing the bracket for mounting the device upon a point of operation panel, with the piston and cylinder separated, and with a portion of the cylinder sidewall being broken away to show the pin registration groove.

Piston sidewall 43 is provided with first peripheral groove 52, second peripheral groove 53, third peripheral groove 54, and fourth peripheral groove 56. These grooves are arranged in parallel, vertically spaced relation around the sidewall 43, as shown in FIGS. 1 and 2. Each groove is provided with a respective O-ring, which provides a gas or liquid impervious seal between adjacent portions of the inner sidewall 17 and the peripheral sidewall 43.

First O-ring 57 and second O-ring 58, respectively define the lower and upper extremities of an annular volume, identified as bypass passageway 59 in FIGS. 1 and 2. The vertical extent of the bypass passageway is sufficient to span the distance between the upper portion of inlet port 19 and the bottom portion of outlet port 21. However, the bypass passageway may be vertically greater than this distance, without deviating from the teachings of the present invention.

Second O-ring 58 and third O-ring 61, respectively define the lower and upper extremities of an annular volume, identified as outlet isolation chamber 62. And, third O-ring 61 and fourth O-ring 63, respectively define the lower and upper extremities of an annular volume, identified as inlet isolation chamber 64.

A top plate 66 is secured over the upper end of cylinder 12 by means of a plurality of flat head screws 67. A threaded bore 68 is centrally provided in plate 66 to accommodate threaded stem 69. The upper end of shaft 69 includes a grippable knob 71. The lower end of shaft 69 has a head 72 thereon. A slotted recess 73, sized and configured to house head 72, is provided in the top portion 41 of piston 39. Upper and lower shims 74 secure head 72 within recess 73.

A vertical registration groove 76 is included in the inner sidewall 17 of cylinder 12. A registration pin 77, snugly lodged within a recess 78 in the top portion of piston 39, slides within groove 76. The desired angular orientation of piston 39 is thereby maintained during vertical translation of piston 39 in cylinder 12.

An inverted L-shaped bracket 79 is secured to top plate 66 by screws 81. Bracket 79, in turn, is attached to point of operation panel 82 by screws 83. One or more filtration devices, each made in accordance with the present teachings, may be bracket mounted to the panel 82. Typically, each such device would include a filter cartridge having different filtration capabilities.

For example, by appropriately changing the filter media or element 84, the filter cartridge 31 can effectively remove a variety of pollutants or contaminants from the inflowing gas or liquid. For example, to filter gases, a molecular sieve, silica gel, activated carbon, or any metal containing an inert supporting reagent may be employed. For liquids, foraminous paper or plastic elements, or entrapping particles, may be used in the cartridge 31, to effect the desired filtration. In the disclosure herein, the cartridge includes a feed tube 86, which leads from the inflow aperture 36 into the lower region of media 84. And, a discharge tube 87, leads from the upper region of media 84 to the outflow aperture 37. Other media or filter elements may require appropriate changes to route the incoming gas or liquid for effective removal of the unwanted pollutants or particles.

With a filter cartridge 31 installed in the apparatus 11, the piston 39 is in a first, lowered position, as shown in FIG. 1. The spatial orientation and attitude of the apparatus and the cartridge is dictated by the particular application, and not limited by operational concerns. Therefore, it should be noted that the characterization of the first position of the piston as being "lowered", is done solely for convenience of explanation, and not by way of limitation on the apparatus itself.

Figures 6, 7:
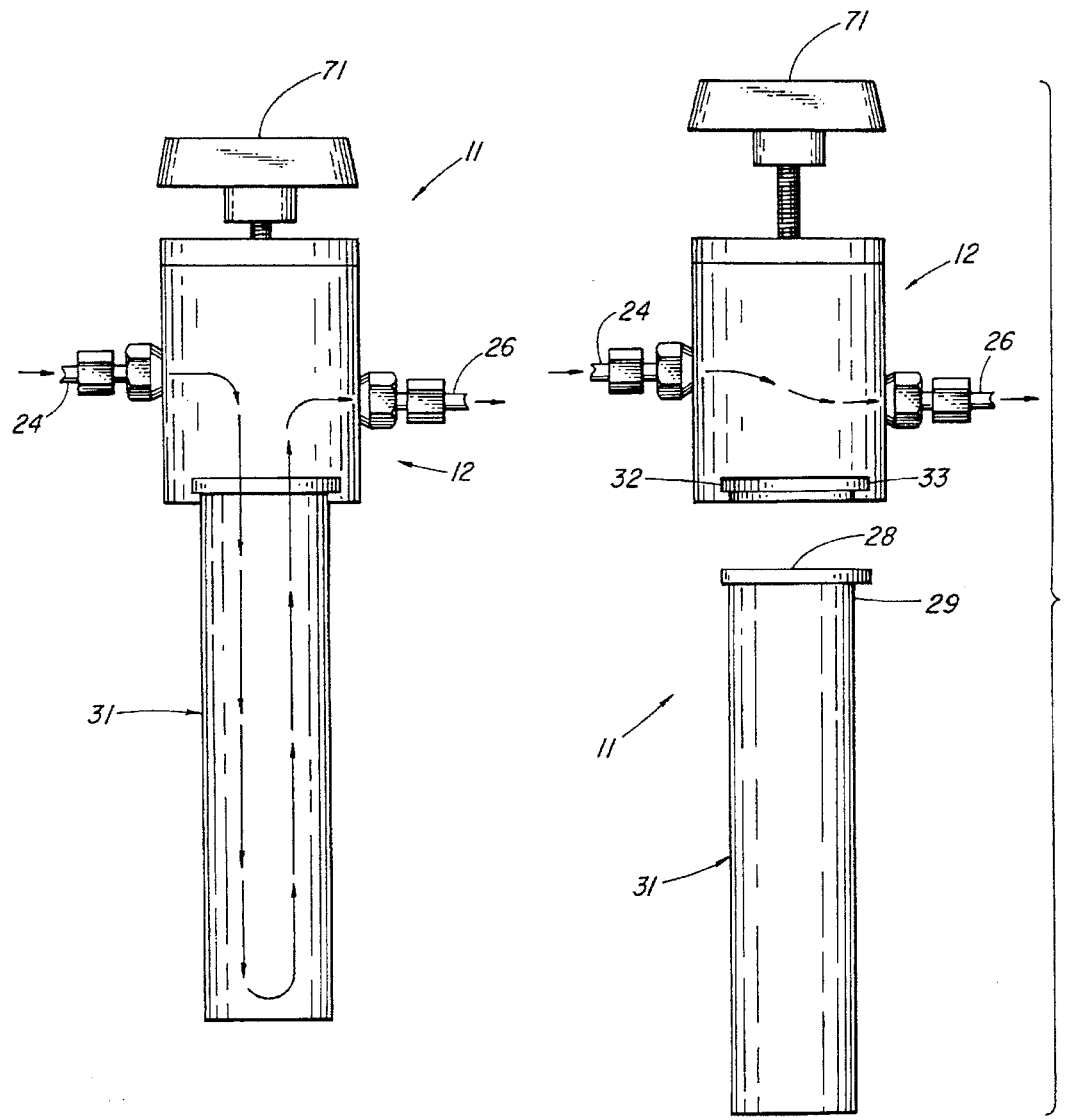
FIG. 6 is a schematic representation of the device, showing gas flow through an installed filter cartridge; and, FIG. 7 is a schematic representation of the device, showing by-pass gas flow through the mounting head, when the spent filter cartridge is removed.

Inlet isolation chamber 64 seals off inlet port 19 so that all incoming gas is directed through inlet passageway 44, inlet pipe 46, and feed tube 86. The filtered gas exits from the media 84, into discharge tube 87, and then through outlet pipe 49 and outlet passageway 48. Outlet isolation chamber 62 seals off outlet port 21, so that all outflowing gas is directed out through outlet line 26. FIG. 6 illustrates a simplified, schematic representation of the gas or liquid flow through the system while filtering.

Once the technician has determined that filter cartridge 31 requires replacement, he rotates knob 71 counter-clockwise, slowly raising the head 72 and the attached piston 39 into a second, raised position (see, FIG. 2). This effects translation of O-ring 58 into a new position, just above the upper portion of inlet port 19. Concurrently, O-ring 57 is also translated to the same extent, into a new position just below the lower portion of outlet port 21. In short, the upper and lower extremities of bypass passageway 59 have been vertically repositioned to enclose the ports 19 and 21.

Therefore, with the piston in this second, raised position, the inlet port 19 and the outlet port 21, are both in communication with the annular bypass passageway 59. In this manner, incoming gas is simply routed directly through the apparatus 11, for the brief time required to change the cartridge 31. FIGS. 2 and 7 illustrate the bypass flow route, through the apparatus 11.

O-rings 58 and 57 provide effective pneumatic seals between outer peripheral sidewall 43 and inner sidewall 17, ensuring that no atmospheric pollution of the contained gas flow can occur. Since top plate 66 caps off the upper end of the cylinder, and the lower end of the cylinder is only exposed to the atmosphere for a short period of time, long-term integrity of the pneumatic seals is assured. And, where the apparatus 11 is used for the filtration of liquids, the O-rings described herein are effective as hydraulic seals, as well.

With the piston 39 in the second, raised position, the inlet pipe 46 and the outlet pipe 49 are well clear of the inflow aperture 36 and outflow aperture 37 in the cartridge so that the technician can readily remove the spent cartridge from the apparatus and replace it with a new cartridge.

Lastly, the technician rotates knob 71 clockwise, lowering the shaft and the attached piston 39 into the first, lowered position, and filtering operation of the apparatus 11 resumes.

What is claimed is:

1. A filter apparatus comprising:
   a. a cylinder having an upper end and an open lower end and a wall therebetween;
   b. a piston movable in said cylinder, said piston having a top portion, a bottom portion, and a peripheral sidewall therebetween, said piston further having an inlet passageway leading from a first side of said sidewall to said bottom portion thereof, and an outlet passageway leading from a second side of said sidewall to said bottom portion thereof;
   c. an inlet port on one side of said cylinder;
   d. an outlet port on another side of said cylinder;
   e. a filter cartridge having an inflow aperture and an outflow aperture on one end, thereof;
   f. means for detachably coupling said one end of said filter cartridge to said, lower end of said cylinder;
   g. means defining a bypass passageway between adjacent portions of said cylinder wall and said piston sidewall;
   h. means for selectively translating said piston from a first position, in which said inlet passageway interconnects said inlet port and said inflow aperture of said filter cartridge, and in which said outlet passageway interconnects said outflow aperture of said filter cartridge with said outlet port, to a second position, in which said bypass passageway means interconnects said inlet port directly with said outlet port, and in which said inlet and outlet passageways are disengaged from said filter cartridge.

2. An apparatus as in claim 1 in which said piston in said first position is adjacent said lower end of said cylinder, and in which said piston in said second position is adjacent said upper end of said cylinder.

3. An apparatus as in claim 1 in which said cylinder and said piston are concentric and right-circular cylindrical in configuration.

4. An apparatus as in claim 3 in which said bypass passageway comprises a pair of grooves, arranged in parallel spaced relation around said peripheral sidewall, and a pair of O-rings, each within a respective one of said grooves, said O-rings defining upper and lower extremities of said passageway and providing a seal between adjacent respective portions of said cylinder wall and said piston sidewall.

5. An apparatus as in claim 3 including a pair of grooves, arranged in parallel spaced relation around said peripheral sidewall, above and below said inlet passageway in said first side, and a pair of O-rings, each within a respective one of said grooves, said O-rings defining upper and lower extremities of an inlet isolation chamber and providing a seal between adjacent respective portions of said cylinder inner wall and said piston sidewall.

6. An apparatus as in claim 3 including a pair of grooves, arranged in parallel spaced relation around said peripheral sidewall, above and below said outlet passageway in said second side, and a pair of O-rings, each within a respective one of said grooves, said O-rings defining upper and lower extremities of an outlet isolation chamber and providing a seal between adjacent respective portions of said cylinder inner wall and said piston sidewall.

7. An apparatus as in claim 1 including a top plate over said upper end of said cylinder, and in which said piston translating means includes a threaded stem having a lower head, an upper end, and a threaded portion therebetween, said threaded portion passing through a tapped opening in said top plate, said head being engaged within a slot in said top portion of said piston, and a knob being attached to said upper end of said stem.

8. An apparatus as in claim 1 in which the one end of the cartridge includes a D-shaped cap defining a coupling flange, said flange having a flat portion adjacent the inflow aperture and remote from the outflow aperture, and coupling means including a U-shaped recess transversely intersecting said open lower end of said cylinder, said recess having a shallow groove on one side and a relatively deep groove on the other side, said shallow groove being sized and configured to accommodate only the flat portion of the flange.

9. An apparatus as in claim 1 in which said inlet port and said outlet port of said cylinder, and said inlet passageway in said first side and said outlet passageway in said second side of said piston, are respectively offset, in vertical relation, an identical predetermined distance.

10. A filter apparatus comprising:
    a. a cylinder;
    b. a piston in said cylinder with a diameter slightly smaller than an inner diameter of said cylinder, said piston having a top portion, a bottom portion, and a peripheral sidewall therebetween, said piston further having an inlet passageway leading from a first side of said sidewall to said bottom portion thereof, and an outlet passageway leading from a second side of said sidewall to said bottom portion thereof;
    c. an inlet port on one side of said cylinder;
    d. an outlet port on another side of said cylinder;
    e. a filter cartridge having an inflow aperture and an outflow aperture on one end thereof;
    f. a filter cartridge coupler on an open, lower end of said cylinder, said coupler detachably receiving said one end of said cartridge;
    g. a bypass passageway, having an upper extremity and a lower extremity defined by O-rings spaced on said peripheral sidewall of said piston, said O-rings spanning a distance between said peripheral sidewall of said piston and an inner wall of said cylinder and forming a seal therebetween;

h. means for selectively translating said piston from a first position to a second position; whereby, in said first position, said inlet passageway interconnects said inlet port and said inflow aperture of said filter cartridge, and said outlet passageway interconnects said outflow aperture of said filter cartridge with said outlet port, and in said second position, said bypass passageway interconnects said inlet port directly with said outlet port, and in which said inlet and outlet passageways are disengaged from said filter cartridge.

11. A filter apparatus comprising:

a. a cylinder having an open top, an open bottom and a wall therebetween, said wall having an inner sidewall and an outer sidewall;

b. a filter cartridge having an inflow aperture and an outflow aperture on one end thereof;

c. means for detachably coupling said one end of said filter cartridge to said open bottom of said cylinder;

d. an inlet port on one side of said cylinder;

e. an outlet port on another side of said cylinder;

f. a piston located within said cylinder, said piston having a top portion and a bottom portion and an outer peripheral sidewall therebetween, and first, second, third, and fourth sealing means arranged in spaced relation around said peripheral sidewall from said bottom portion to said top portion, said first and second sealing means defining a bypass passageway, said second and said third sealing means defining an outlet isolation chamber, and said third and said fourth sealing means defining an inlet isolation chamber, said piston further having an inlet passageway extending from a first side of said sidewall to said bottom portion, and an outlet passageway extending from a second side of said sidewall to said bottom portion;

g. means for selectively translating said piston between a first position, adjacent a lower end of said cylinder, in which said inlet passageway interconnects said inlet port and said inflow aperture of said filter cartridge, and in which said outlet passageway interconnects said outflow aperture of said filter cartridge with said outlet port, and a second position, adjacent an upper end of said cylinder, in which said bypass passageway interconnects said inlet port directly with said outlet port, and in which said inlet and outlet passageways are disengaged from said filter cartridge.

12. An apparatus as in claim 11 including a top plate over said open top of said cylinder, and in which said means for translating includes a threaded stem having a lower head, an upper end and a threaded portion therebetween, said threaded portion passing through a threaded opening in said top plate, said head being engaged within a slot in said top portion of said piston, and a knob being attached to said upper end of said stem.

13. An apparatus as in claim 11 in which said first, second, third, and fourth sealing means includes O-rings.

14. An apparatus as in claim 11 in which said cylinder and said piston are concentric and right-circular cylindrical in configuration.

15. An apparatus as in claim 11 in which said inlet port and said outlet port, and said inlet passageway in said first side and said outlet passageway in said second side, are respectively offset in vertical relation, an identical predetermined distance.

* * * * *